Nov. 26, 1929.  F. JERMÁŘ  1,737,311
WEIR SHUTTER
Filed June 13, 1927
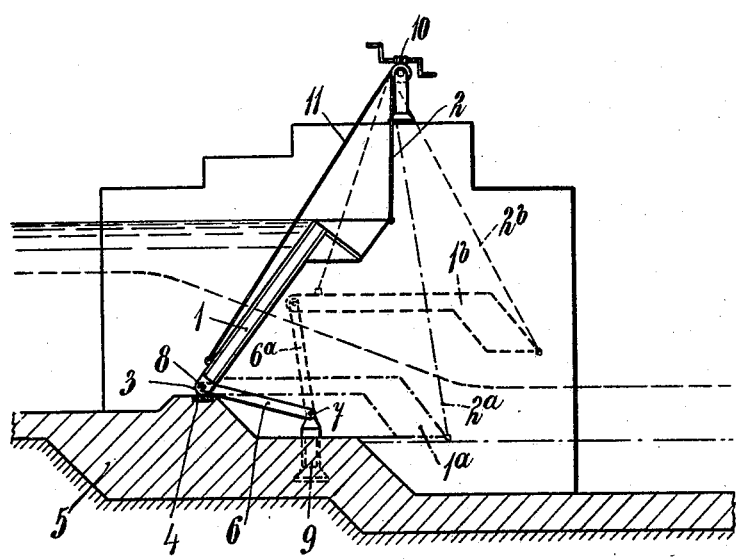
Inventor:
František Jermář.

Patented Nov. 26, 1929

1,737,311

UNITED STATES PATENT OFFICE

FRANTIŠEK JERMÁŘ, OF OPAVA, CZECHOSLOVAKIA

WEIR SHUTTER

Application filed June 13, 1927, Serial No. 198,595, and in Czechoslovakia January 5, 1927.

This invention relates to a weir of the kind wherein a horizontally hinged weir shutter is adjusted by means of cables and controlled by links whereon it can be raised from its seat so as to be accessible above the water surface for cleaning, for repairs and for drying purposes.

The object of the invention is to produce a weir of simple construction having a shutter which is rigidly supported by the substructure and which forms automatically a tight fit, and the invention consists in the provision of a shutter having a cylindrical lower edge whereby it rests normally on a tightening strip, the shutter being supported by links which are pivoted at one end to the shutter and at the other end to fixed supports situated at the low-water side of the weir.

The accompanying drawing represents a side view of the arrangement.

The weir shutter 1 is formed with a cylindrical lower edge 3 of wood or metal whereby the shutter rests against a tightening and supporting strip 4 made of wood, metal, concrete or the like and built into the substructure 5. The shutter is retained on the strip by means of links 6 which are pivoted at 8 to the shutter and at 7 to fixed supports 9 situated at the low-water side of the weir. The free end of the shutter is controlled by cables 2 which are operated by a winch 10 for swinging the shutter about the hinges 8 for regulating the weir while the cylindrical surface 3 maintains a tight joint with the strip 4. The dotted outlines 1ª and 2ª show the shutter in the horizontal and lowermost position. Another cable or set of cables 11 connects the winch 10 with the shutter so that it can be raised bodily into the position shown by the dotted lines 1ᵇ and 2ᵇ while the links 6 swing about the pivots 7. In the raised position, the shutter is quite clear of the water and is therefore readily accessible for effecting repairs as well as for cleaning and drying.

I claim:

A weir of the character described comprising a weir shutter having a cylindrical lower edge, a tightening strip supporting the shutter by contact with said edge, links pivoted at one end to fixed supports situated at the low-water side of the weir and at the other end to the cylindrical edge of the shutter so as to form hinge elements and struts for the same, and cables for adjusting the shutter about the hinge elements and for raising it about the fixed link supports.

FRANTIŠEK JERMÁŘ.